(12) United States Patent
Wittmann et al.

(10) Patent No.: US 10,336,557 B2
(45) Date of Patent: Jul. 2, 2019

(54) TRANSPORT SECTION, METHOD FOR ADJUSTING AND/OR READJUSTING AT LEAST ONE TRANSPORT TRACK WITHIN A TRANSPORT SECTION, AND PACKAGING FACILITY

(71) Applicant: KRONES Aktiengesellschaft, Neutraubling (DE)

(72) Inventors: Stephan Wittmann, Neubeuern (DE); Juergen Werner, Bruckmühl (DE); Herbert Spindler, Niedermoosen (DE); Thomas Wimmer, Rosenheim (DE)

(73) Assignee: Krones Aktiengesellschaft, Neutraubling (DE)

( * ) Notice: Subject to any disclaimer, the term of this patent is extended or adjusted under 35 U.S.C. 154(b) by 0 days.

(21) Appl. No.: 15/911,522

(22) Filed: Mar. 5, 2018

(65) Prior Publication Data
US 2018/0305138 A1   Oct. 25, 2018

(30) Foreign Application Priority Data
Mar. 6, 2017   (DE) ........................ 10 2017 203 600

(51) Int. Cl.
*B65B 21/04*   (2006.01)
*B65G 21/06*   (2006.01)
(Continued)

(52) U.S. Cl.
CPC ............ *B65G 47/766* (2013.01); *B65B 21/04* (2013.01); *B65B 35/30* (2013.01); *B65B 35/44* (2013.01);
(Continued)

(58) Field of Classification Search
CPC ...... B65G 19/02; B65G 47/682; B65G 47/68; B65G 21/20; B65G 21/2072; B65G 21/06; B65G 21/16
(Continued)

(56) References Cited

U.S. PATENT DOCUMENTS

| | | | |
|---|---|---|---|
| 4,432,189 A * | 2/1984 | Raudat | B65B 39/006 53/248 |
| 5,056,298 A | 10/1991 | Deadmond | |

(Continued)

FOREIGN PATENT DOCUMENTS

JP   S58139909   8/1983

OTHER PUBLICATIONS

German Application No. 10 2017 203 600.1 filed Mar. 6, 2017—German Search Report dated Jan. 30, 2018.
(Continued)

*Primary Examiner* — James R Bidwell
(74) *Attorney, Agent, or Firm* — Simmons Perrine Moyer Bergman PLC

(57) ABSTRACT

The invention relates to device, method and packaging facility having a transport section (17) for feeding article arrangements (5) in a transport direction (TR) to a packaging module (18). The transport section (17) comprises a transfer plate (15), on which the articles (2) of the article arrangements (5) are movable in a sliding manner. Located above the transfer plate (15) are pushing devices (16) for moving the articles (2) on the transfer plate (15), with the pushing devices (16) being movable in transport direction (TR) at least in some areas. The transport section (17) furthermore comprises outer guide elements (20) and inner guide elements (21) disposed on the transfer plate (15), with the outer guide elements (20) laterally delimiting the transport section (17) and, with the inner guide elements (21) being readjust-
(Continued)

able by at least one readjustment mechanism that is disposed at least partly below the transfer plate (15).

14 Claims, 7 Drawing Sheets

(51) Int. Cl.
| | |
|---|---|
| *B65G 21/20* | (2006.01) |
| *B65G 47/76* | (2006.01) |
| *B65B 35/30* | (2006.01) |
| *B65G 47/08* | (2006.01) |
| *B65G 47/84* | (2006.01) |
| *B65B 35/44* | (2006.01) |
| *B65B 53/02* | (2006.01) |
| *B65G 47/26* | (2006.01) |
| *B65G 47/71* | (2006.01) |
| *B65G 47/88* | (2006.01) |

(52) U.S. Cl.
CPC .............. *B65B 53/02* (2013.01); *B65G 21/06* (2013.01); *B65G 21/20* (2013.01); *B65G 21/2072* (2013.01); *B65G 47/088* (2013.01); *B65G 47/261* (2013.01); *B65G 47/71* (2013.01); *B65G 47/841* (2013.01); *B65G 47/8876* (2013.01); *B65G 2201/0244* (2013.01)

(58) Field of Classification Search
USPC ...................... 198/836.3, 725, 728, 426, 430
See application file for complete search history.

(56) References Cited

U.S. PATENT DOCUMENTS

| | | | |
|---|---|---|---|
| 5,540,036 A | 7/1996 | Scroggin et al. | |
| 5,667,055 A | 9/1997 | Gambetti | |
| 5,761,882 A | 6/1998 | Gambetti | |
| 6,688,456 B2 * | 2/2004 | Jones ................. | B65G 47/2445 198/415 |
| 7,665,596 B2 | 2/2010 | Kolbe et al. | |
| 8,113,335 B2 | 2/2012 | Aronsson et al. | |
| 8,371,433 B2 | 2/2013 | Jendrichowski | |
| 8,668,073 B2 * | 3/2014 | Petrovic ............. | B65G 21/2072 198/452 |
| 8,931,631 B2 * | 1/2015 | Vasse ................. | B65G 21/2072 198/836.1 |
| 2009/0223782 A1 * | 9/2009 | Martin .................... | B65B 35/44 198/617 |
| 2010/0326015 A1 | 12/2010 | Miller et al. | |
| 2013/0199897 A1 | 8/2013 | Vasse et al. | |
| 2014/0032748 A1 | 1/2014 | Pruthi et al. | |

OTHER PUBLICATIONS

YouTube Video: High Performance Packaging Machine for Tray Shrink Packages—Type VP530 SW90-TM-60-2; https://www.youtube.com/watch?v=A7jYIK6KNAo.

European Application No. EP 18 15 5773—Extended European Search Report dated Aug. 7, 2018.

* cited by examiner

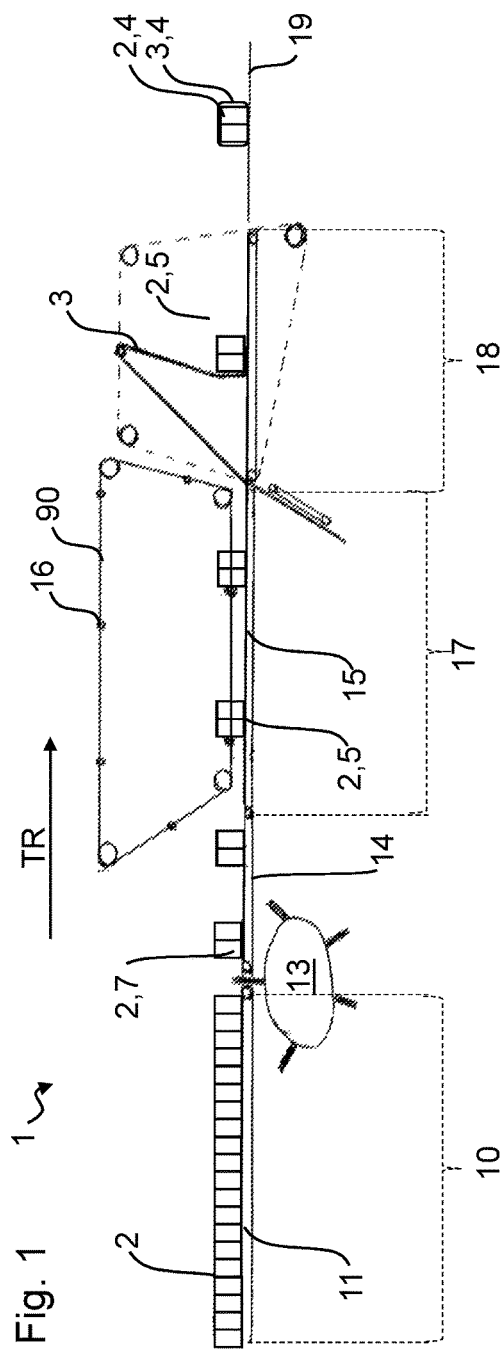
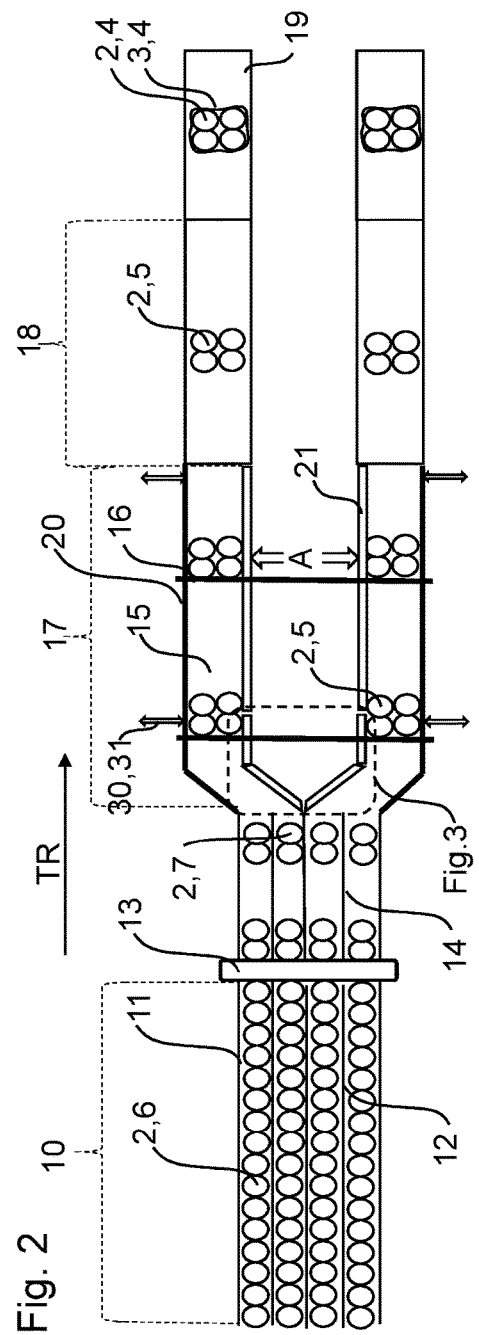

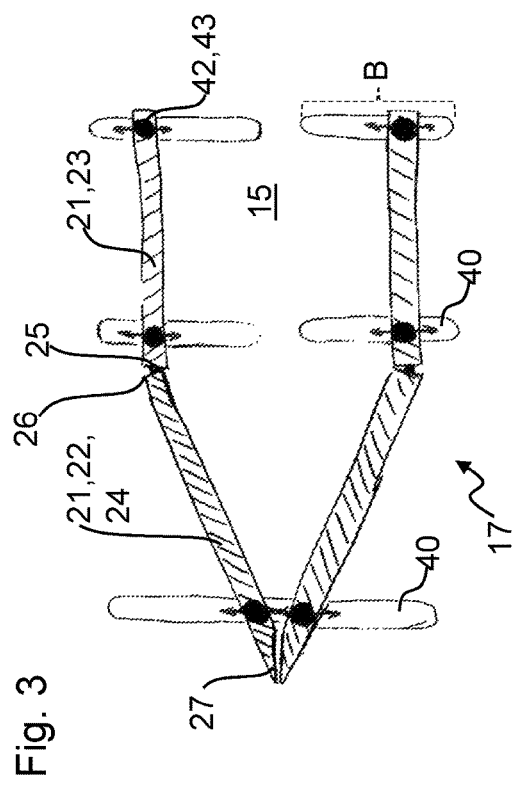
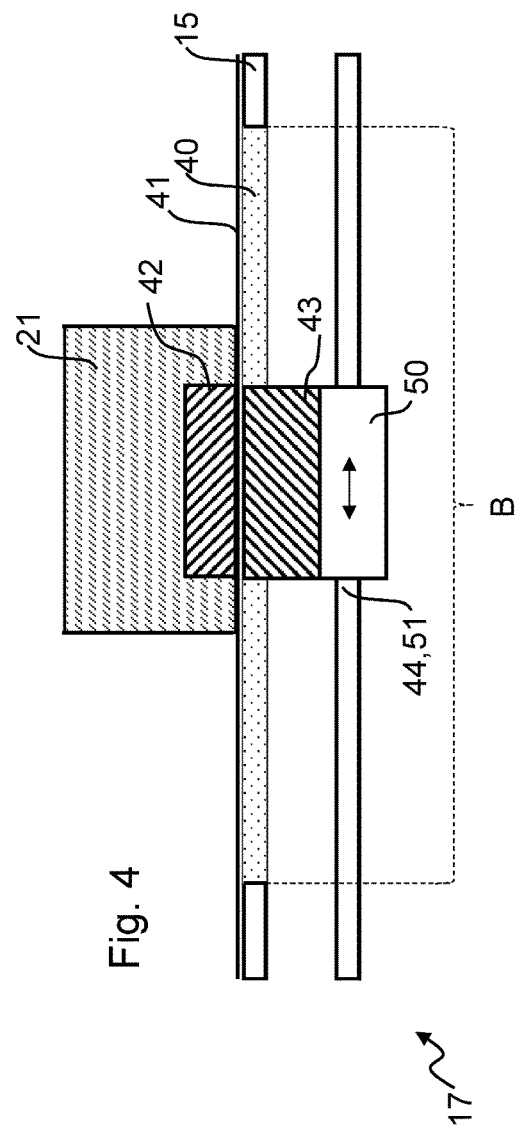
Fig. 3
Fig. 4

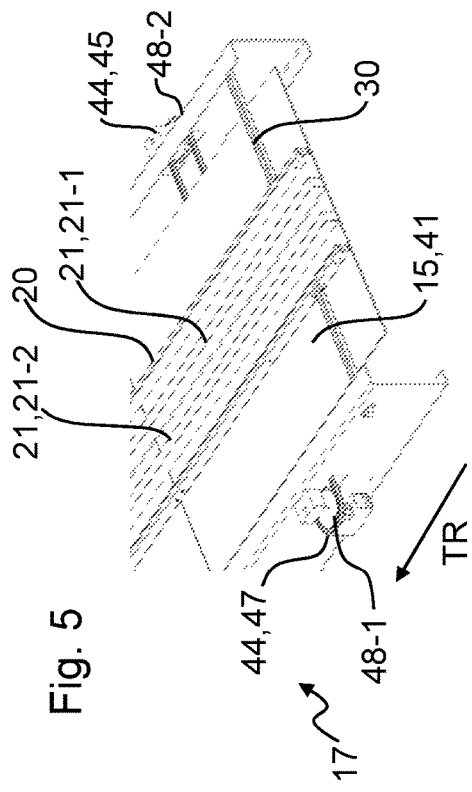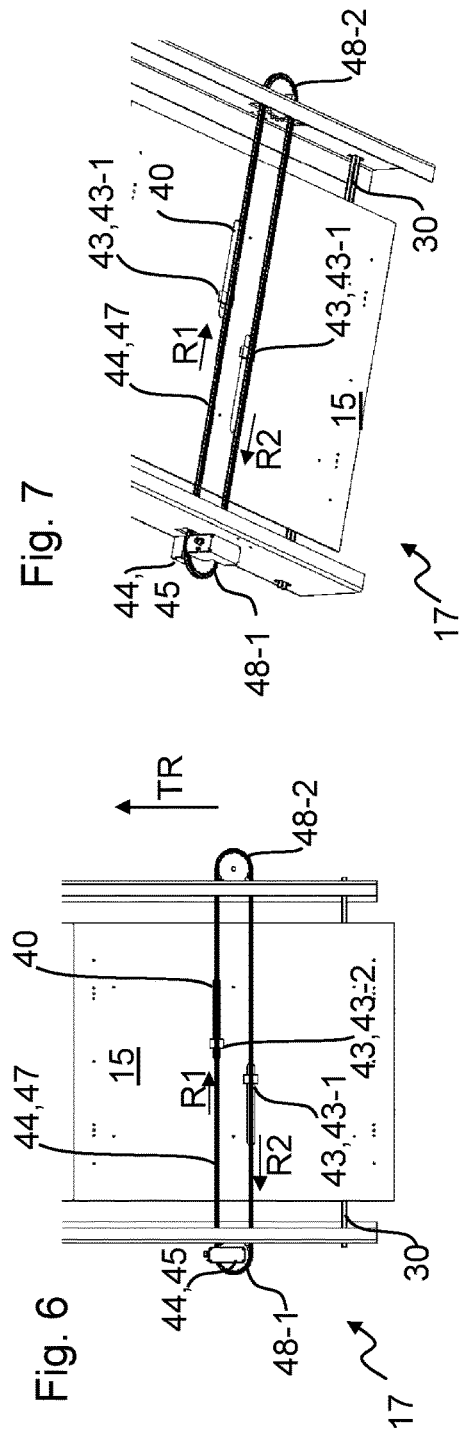

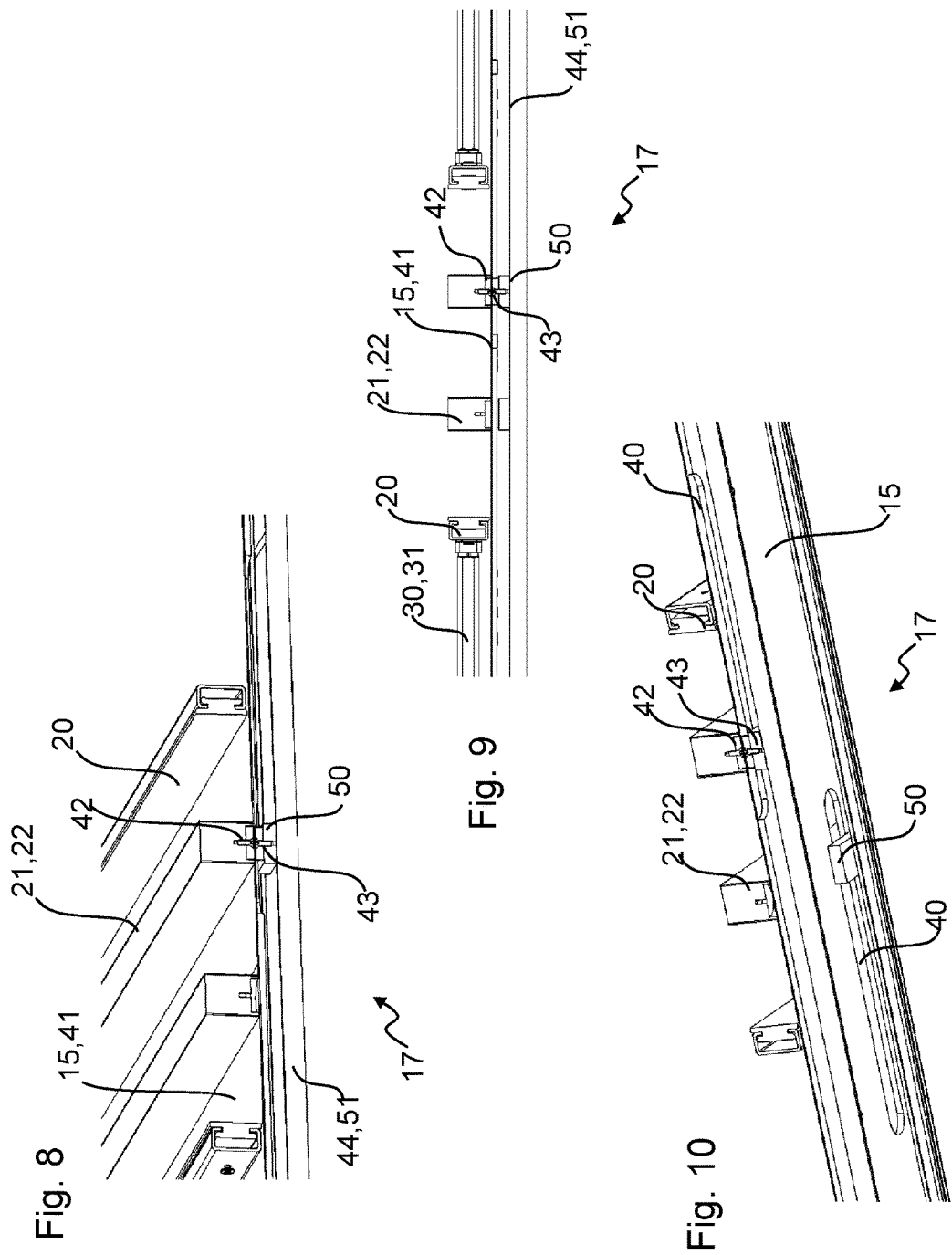

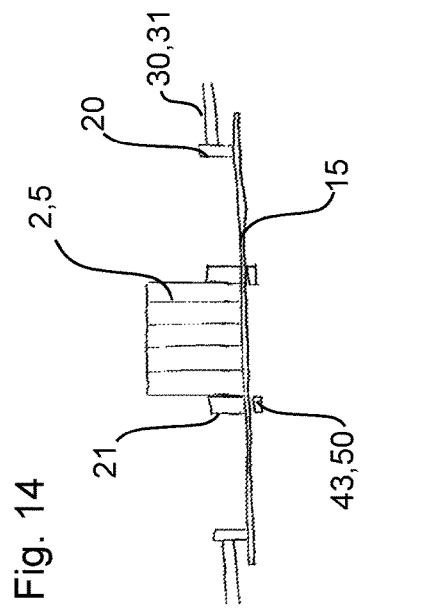
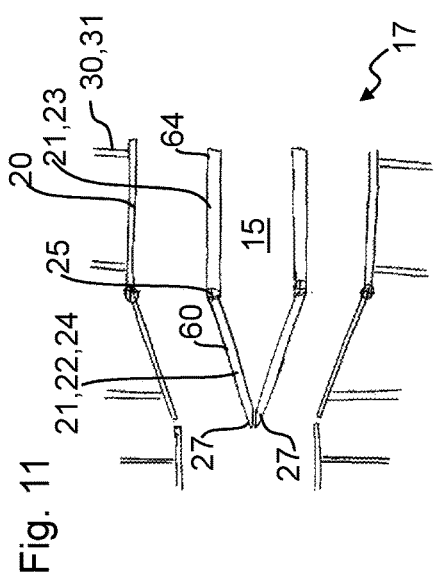
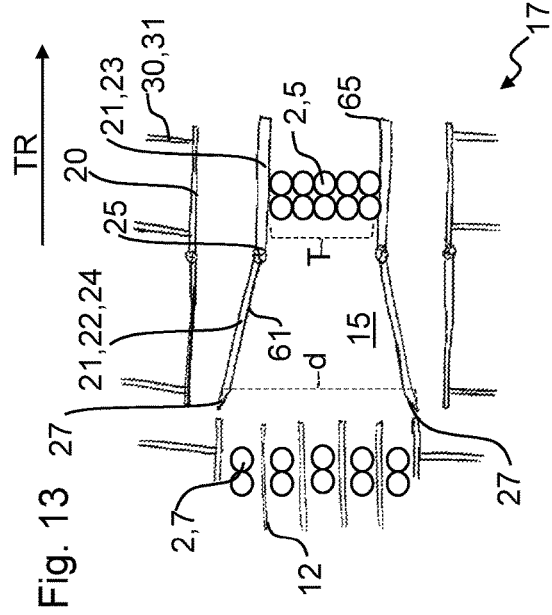

TRANSPORT SECTION, METHOD FOR ADJUSTING AND/OR READJUSTING AT LEAST ONE TRANSPORT TRACK WITHIN A TRANSPORT SECTION, AND PACKAGING FACILITY

CLAIM OF PRIORITY

The present application claims priority to German Application DE 10 2017 203 600.1, filed Mar. 6, 2017, which is incorporated by reference.

FIELD OF THE INVENTION

The present invention concerns a transport section for feeding article arrangements to a packaging module, whereby the article arrangements are moved in a transport direction to the packaging module, further a method for adjusting and/or readjusting at least one transport track within a transport section, and a packaging facility for article arrangements according to the characteristics of the independent claims.

BACKGROUND OF THE INVENTION

The invention concerns a transport section for feeding article arrangements in a transport direction to a packaging module, in particular a transfer module for transferring article arrangements to a film wrapping module or the like. In the film wrapping module, the previously grouped arrangements of articles, e.g. two articles or groups of 2×2 articles, 2×3 articles, 2×4 articles, 3×4 articles or the like are transferred onto a shrink film. This shrink film is then wrapped around the article arrangement and shrunk onto the article arrangement by a heat source. For example, the article arrangements are prepared in a grouping station arranged before the transport section in the direction of transport and assembled within the transport section in accordance with the product requirements. Depending on the respective product specifications, the article arrangements are processed in single or multiple lanes within the transport section. In the case of multi-track processing, it may be necessary to generate a distance between the parallel-guided article arrangements before the film wrapping module in the transport section according to a specified film overhang.

Publication WO 2014/18753 A1 describes a device for the production of packs whereby containers are converted from a wide container stream into several single-lane container streams by a lane division, and container groups are formed and subsequently united to form a bundle.

SUMMARY OF THE INVENTION

One purpose of the invention is to equip a transport section for article arrangements in the feeding area of a packaging module in such a way that this transport section can be adapted quickly and easily to the respective product requirements, wherein, in particular, no labor-intensive exchange of format parts is necessary.

The above purpose is achieved by a transport section, a method for adjusting and/or readjusting at least one transport track within a transport section, and a packaging facility comprising the features of the independent claims. Further advantageous configurations are described by the dependent claims.

The invention refers to a transport section for feeding article arrangements to a packaging module whereby the article arrangements are moved in a transport direction towards the packaging module. The invention also refers to a method for adjusting and/or readjusting at least one transport track within a transport section, and a packaging facility for article arrangements.

Such a packaging facility comprises at least one grouping unit for assembling the articles into article arrangements and a packaging module, wherein the grouping unit comprises a transport section for feeding the article arrangements in a transport direction to the packaging module.

In a conveying section arranged in the direction of transport upstream of the transport section, a dividing device can pre-group the articles. In particular, the dividing device and the transport section with a pushing device described in more detail below form the so-called grouping unit for the articles. In the transport section, the articles pre-grouped by the dividing device are grouped together in a final grouping to form the required article arrangement. The article arrangement is subsequently combined and/or united within the packaging module using an outer packaging.

The articles may be beverage containers such as bottles or cans. Provision may be made for a plurality of identical or different articles to be grouped according to the respective requirements and to be combined and/or united by carton packaging, by one strapping or several strappings, by film packaging or the like to form a bundle or mixed bundle. For example, a number of beverage containers can be held together by shrink wrapping, one strapping band or several strapping bands, an outer cardboard wrapping, or similar means.

The articles are fed to the conveying section preferably in parallel rows. The parallel rows can be separated, for example, by lane dividers or by a spatial distance from each other. An article dividing device provided for in the conveying section may, in particular, work with divider bars which move upwards at the lateral edges of the article contours from below the transport level. After carrying out alignment, division and/or retention procedures, the divider bars ensure that the desired gap forms between consecutive transported article groups within a row relative to the continuously supplied articles conveyed in a mass stream on the horizontal conveyors.

The transport section following the conveying section comprises grouping device used for providing a desired final article grouping after the pre-grouping in an upstream conveying section. The grouping device can be used in particular to form groups of articles within the transport section which are to be wrapped at a later stage with an outer packaging, for example a strapping or shrink film or similar, which article groups preferably have the articles arranged in a rectangular formation.

The transport section comprises a transfer plate, on which the articles of the article arrangements can be moved in a sliding manner. In particular, pushing devices are provided above the transfer plate for moving the articles on the transfer plate. The pushing devices are movable at least in sections in the direction of transport. During their movement in the direction of transport, the pushing devices take the articles with them. For example, pusher bars arranged on push chains may be provided. These pusher bars are arranged behind the pre-grouped articles formed in the conveying section by lowering the pusher bars from above behind the articles. The pusher bars are guided at least in sections in the transport direction above the transfer plate equipped with a low-friction surface. The pusher bars are arranged behind pre-grouped articles arriving from the conveying section and take these articles with them when moving in the direction of transport. Thereby, the articles slide particularly over the transfer plate.

The transport section is limited laterally by outer guide elements. These are preferably adjustable relative to each other so that the transport width on the transfer plate can be limited. For example, the outer guide elements can be shifted parallel to the transport direction by pushing rods, rod gears, or the like, which act on the outer guide elements laterally from the outside. When the outer guide elements are moved towards the center of the transfer plate, the transport width is reduced. On the other hand, the transport width is increased when the outer guide elements are moved to the edge of the transfer plate respectively.

In addition, the transport section includes internal guiding elements arranged on the transfer plate, which can be adjusted by at least one readjustment mechanism, which is at least partly located below the transfer plate. By this readjustment mechanism at least one transport track can be formed and/or set up on the transfer plate of the transport section according to the desired article arrangement(s).

According to an embodiment of the invention, the inner guide elements comprise a first magnet, and the at least one readjustment mechanism comprises a second magnet arranged below the transfer plate. If the second magnet is transferred from a first working position to a second working position either manually or automatically driven, the position change is transferred via the magnetic forces to the first magnet, which leads to an adjustment of the respectively assigned inner guide elements. Especially the inner guide elements are transferred from a first position and/or first arrangement on the transfer plate to a second position and/or second arrangement on the transfer plate.

According to an embodiment of the invention, the transfer plate has openings formed at least in sections orthogonally to the transport direction of the articles on the transfer plate. In particular, the openings are long slots or slits formed orthogonally to the transport direction of the articles. In these openings, especially in the long slots or slits, at least parts of the at least one readjustment mechanism can be guided in a movable manner.

For example, the at least one readjustment mechanism includes a first magnet on the inner guide elements and a second magnet guided within the openings. The second magnet is arranged in particular at readjustment mechanism located below the transfer plate. For example, the second magnet is arranged on slides which are guided on slide guides, the slide guides being arranged orthogonally to the direction of transport. Therefore, the second magnet can be relocated within the openings when the slides are moved on the slide guides. The slides can be adjusted manually or automatically by a suitable drive.

It has to be ensured that the articles moving on the transfer plate do not get caught or get stuck on the openings of the transfer plates, which could lead to an overturning of articles and thus disturb the production process. Therefore, it must be ensured that the width of the openings—seen parallel to the transport direction of the articles—is as small as possible. If magnetically acting readjustment mechanisms are used, a non-magnetic coating can be disposed on the transfer plate, whereby the non-magnetic coating covers the openings. Either magnetic force acts between the first and second magnet through the non-magnetic coating and/or the magnetic force between the first and second magnet is not or is only slightly disturbed by the non-magnetic coating. By such a non-magnetic coating, it is possible to effectively prevent the hook-up or the like of the articles moved on the transfer plate and thus prevent interference in the production process.

In addition, it may be provided that the transport section is divided into a plurality of segments in the transport direction, with two inner guide elements assigned to each segment. The inner guide elements arranged within a segment can be connected to each other in such a way that an adjustment of the position of one inner guide element within a segment on or relative to the transfer plate simultaneously causes an adjustment of the other inner guide element within this segment on or relative to the transfer plate. Especially, the inner guide elements arranged within a segment can be mechanically connected to each other. For example, the adjustment movement of one inner guide element causes a counter-rotating movement of the other inner guide element. Alternatively, the adjustment movement of one inner guide element can also cause a rectified adjustment movement of the other inner guide element.

Alternatively, it may be provided that each of the inner guide elements of a segment includes its own readjustment mechanism, possibly with its own drive, so that the two inner guide elements of each segment can be adjusted independently of each other.

According to a first embodiment of the invention, two first inner guide elements are arranged in a first segment of an infeed area of the transport section and whereby the two first inner guide elements are aligned at an angle to the transport direction. In particular, the two first inner guide elements are aligned at an angle between 0° and 90° to the transport direction. Preferably, it is provided that the angle between the two first inner guide elements can be adjusted relative to the transport direction, especially at an angle between −90° and 90° to the transport direction.

In addition, it may be provided that at least two second inner guide elements are arranged in one segment disposed downstream, wherein the two second inner guide elements are arranged essentially parallel to the transport direction. The two second inner guide elements are preferably designed to be movable perpendicular to the transport direction, so that they can be moved and positioned parallel to the transport direction on the transfer plate. However, it may also be provided that the second inner guide elements can be disposed at an angle to the transport direction, preferably at an angle between −50° and 50° to the transport direction. This can be particularly advantageous if the distancing of the article arrangements generated by the first inner guide elements diverging in the transport direction does not sufficiently meet the desired product specifications or the requirements of the subsequent packaging module.

The inner guide elements arranged in the successive segments can move independently of each other, in particular no connection is provided between the inner guide elements arranged in the successive segments. Alternatively, the inner guide elements, which are essentially arranged in an alignment, can be connected to each other, whereby the connection must be designed in such a flexible way that it allows the inner guide elements of a segment to be adjusted without the inner guide elements of the adjacent segments having to be adjusted at the same time.

Preferably, the second inner guide elements of the second segment, third segment, fourth segment, etc., arranged one after the other in the transport direction, are each arranged in alignment. On the other hand, the first inner guide elements arranged within the first segment of the transport section as seen in transport direction can be aligned at a clearly different angle to the transport direction. For this reason, it may be useful to attach a first inner guide element to be disposed swivelably movable by a swivel joint to a second inner guide element. Alternatively, suitable hinged connections can also be provided between successive second inner guide elements, in each instance suitable for coupling the respective second inner guide elements.

For example, it is possible that the two first inner guide elements are arranged to diverge in the transport direction, with the free end sections of the first inner guide elements in particular coming into contact or almost touching each other in the infeed area of the transport section. The two first inner guide elements thus form an expansion wedge, which divides the transport section into two transport tracks, with one outer side of each inner guide element forming the inner guide of the respective transport track, and with one inner side of each of the outer guide elements described above forming the outer guide of the respective transport track. The pre-grouped articles fed in parallel rows are grouped by the expansion wedge into two article arrangements and fed into the transport tracks. The two article arrangements can be separated from each other or spread out and distanced from each other by the expansion wedge formed from the two first inner guide elements in such a way as is necessary for the subsequent processing in the packaging module. In particular, the two article arrangements are distanced or spread out in accordance with the spreading dimension of a film wrapping module arranged downstream.

However, the two first inner guide elements can also be arranged in such a way that they converge in the transport direction. Thereby, in particular, the free end areas of the first inner guide elements in the infeed area of the transport section are at maximum distance from each other. The two first inner guide elements thus form a funnel that tapers in the direction of transport and defines a transport track on the transport section. In this case, the inner sides of the inner guide elements form the outer guide of the transport track. The pre-grouped articles fed in parallel rows are merged or grouped together by the funnel in an article arrangement and fed into one transport track which is limited on the outside by the inner guides. The article arrangement formed thereby is then fed to the following packaging module.

According to another embodiment of the invention, a fixed expansion wedge is disposed in the foremost segment within the infeed area of the transport section as seen in transport direction. At least in one segment arranged downstream, preferably in all segments arranged downstream, two adjustable inner guide elements are arranged on the transfer plate within each segment. The position of the inner guide elements can be adjusted on the transfer plate particularly parallel to the transport direction and/or at an angle to the transport direction.

Preferably, an inner guide element of the second segment is arranged at each of the two rear corners of the expansion wedge. In particular, a swiveling connection is provided between the respective corner and the respective end of the inner guide element. The adjustment of the inner guide elements of the subsequent segments is carried out in such a way that the inner guide elements form two rows in the transport direction. The two rows are arranged at least in sections parallel to the direction of transport and/or at least in sections diverging in the direction of transport and/or at least in sections converging in the direction of transport, depending on the required spreading dimension in accordance with the requirements of the subsequent packaging module.

The expansion wedge divides the transport section into two transport tracks. In particular, the pre-grouped articles fed in parallel rows are grouped by the expansion wedge into two article arrangements and guided into the two transport tracks. In this case, each outer side of the expansion wedge and the outer sides of the subsequently arranged inner guide elements form the inner guidance of the respective transport track and one inner side of each of the above-mentioned outer guide elements, which are essentially arranged in alignment, forms the outer guidance of the respective transport track. The necessary spacing or spreading of the article arrangements for subsequent processing in the packaging module is made possible by the adjustable arrangement of the inner guide elements of the subsequent segments.

The movement of the two inner guide elements per segment can, according to an embodiment, be coupled with each other in such a way that when one inner guide element moves in one direction, preferably a simultaneous movement of the other inner guide element in the opposite direction is generated. For example, the readjustment mechanism which is arranged at least partly underneath the transfer plate and/or which extent through the transfer plate at least partially are arranged on opposite areas of a circular adjustment chain, which results in a forced counter-movement of the other readjustment mechanism and the internal guide element assigned to the other readjustment mechanism when one readjustment mechanism and the corresponding internal guide element are moved.

Alternatively, it may be provided that the inner guide elements are each equipped with their own independent drive and can therefore be adjusted independently of each other, further increasing the flexibility of the overall system.

If, on the other hand, a single-lane merging of several parallel article rows is required for the just described embodiment with an expansion wedge—as described above in connection with the first and second inner guide elements—the expansion wedge can be removed from the transport section and the desired lane merging can be achieved by appropriately arranging the inner guide elements of the subsequent segments. In this case, the articles entering to the transfer plate and being moved on to the transfer plate by a shifting movement are either not guided laterally in the first segment or the outer guide elements of the first segment are positioned accordingly to ensure an outer guidance in the first segment.

In accordance with a further embodiment of the at least one readjustment mechanism for the inner guide elements, this readjustment mechanism comprises an adjustment element, which is guided through the respective opening of the transfer plate and which is connected to the inner guide element. The adjustment element can be moved by at least one readjustment mechanism, which is located below the transfer plate, whereby the adjustment element is movable within the opening and thus transverse to the transport direction of the articles on the transfer plate. The movement of the readjustment mechanism causes a change in the position and/or arrangement of the associated inner guide element on the transfer plate.

For example, the adjustment element is designed as a thin sheet metal or the like. The adjustment element is arranged within the opening and extends through the opening, the upper end of the sheet metal or the like is connected to the inner guide element above the transfer plate. The lower end of the sheet metal or the like, located below the transfer plate, is attached to a readjustment mechanism, e.g. to a sliding adjustment rod, to a slide assigned to a slide guide or the like. The readjustment mechanism located below the transfer plate are controlled in such a way that the sheet metal and the respective associated and/or coupled inner guide element can be moved to a desired position. The adjustment can be carried out manually, semi-automatically or fully automatically. In particular, a suitable control device is provided for controlling the readjustment mechanism or the drives assigned to the readjustment mechanism according to the desired product composition.

BRIEF DESCRIPTION OF THE FIGURES

In the following passages, the attached figures further illustrate exemplary embodiments of the invention and their advantages. The size ratios of the individual elements in the figures do not necessarily reflect the real size ratios. It is to be understood that in some instances, various aspects of the invention may be shown exaggerated or enlarged to facilitate an understanding of the invention.

FIG. 1 shows a schematic side view of a first embodiment of a packaging facility for assembling articles as bundles.

FIG. 2 shows a schematic view of a first embodiment of a packaging facility for assembling articles as bundles according to FIG. 1 as seen from the top.

FIG. 3 shows a detail of the transfer area according to FIG. 2.

FIG. 4 shows a schematic illustration of a first embodiment of the adjustment of the inner guide elements.

FIG. 5 shows a perspective view of a transfer area as seen from the top.

FIG. 6 shows a transfer area as seen from below.

FIG. 7 shows a perspective view of a transfer area as seen from below.

FIG. 8 shows a perspective sectional representation through the transfer area in the section of the adjustment elements seen from above.

FIG. 9 shows a sectional representation through the transfer area in the section of the adjustment elements.

FIG. 10 shows a perspective sectional representation through the transfer area in the section of the adjustment elements seen from below.

FIG. 11 shows the formation of two parallel arrangements of articles according to FIG. 2 in the transfer area as seen from above.

FIG. 12 shows a lateral representation of the formation of two parallel arrangements of articles according to FIG. 2 and FIG. 11 in the transfer area.

FIG. 13 shows the formation of a single arrangement of articles in the transfer area as seen from above.

FIG. 14 shows a lateral representation of the formation of a single arrangement of articles in the transfer area as shown in FIG. 13 seen from above.

Figure 16:
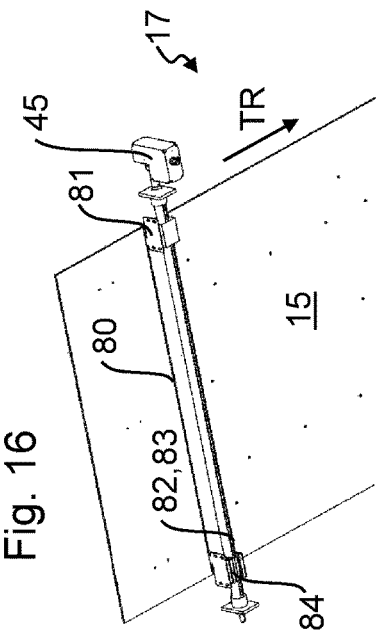
FIG. 16 shows a transfer area from below to illustrate another embodiment of an adjustment of the inner guide elements.

The same or equivalent elements of the invention are designated by identical reference characters. Furthermore, and for the sake of clarity, only the reference characters relevant for describing the respective figure are provided. It should be understood that the embodiments described are only examples describing an embodiment of the device and/or method according to the invention. They are not intended to limit the scope of the disclosure.

DETAILED DESCRIPTION OF THE INVENTION

The schematic side view of FIG. 1 shows a first embodiment of a packaging facility 1 for assembling articles 2 into bundles 4 in a side view, and FIG. 2 shows a corresponding packaging facility 1 as seen from above. In this case, an arrangement 5 of articles 2 is combined and/or united into one bundle 4 by a shrink film 3 or other suitable outer packaging.

The packaging facility 1 comprises an article feed 10. In this case, articles 2 are preferably moved in several parallel article rows 6 via a conveying device, e.g. a conveyor belt 11, in the transport direction TR. The rows 6, for example, can be spatially separated from each other by lane separators 12 and moved spatially separated from each other on the conveyor belt 11. Alternatively, articles 2 are divided into parallel rows in a module arranged upstream.

Articles 2 supplied in article rows 6 are pre-grouped in a subsequent transport section. For example, article groups 7 are separated from the article rows 6 by a divider 13, where the jointly grouped articles 2 are arranged one after the other. Article groups 7 are transported on a further conveyor belt 14 in the transport direction TR to a further transport section. This further transport section is in particular a transfer area 17 with a transfer panel or transfer plate 15, inner guide elements 21 and outer guide elements 20. In particular, the outer guide elements 20 can be used to adjust and limit the width available for article transport in the transfer area 17. For example, the outer guide elements 20 can be adjusted by suitable readjustment mechanism 30, preferably the outer guide elements 20 are shifted parallel to the transport direction TR, e.g. the outer guide elements 20 can be adjusted by readjustment spindles 31 or the like.

Article groups 7 are moved passively on the transfer plate 15, for example by pushing them with pushing devices such as pusher bars 16. For example, the pusher bars 16 are driven by carrier belts or pushing chains 90 arranged on both sides above the transfer plate 15, whereby the carrier belts or pushing chains 90 move the pusher bars 16 at least in sections in the transport direction TR. The pusher bars 16 attached to the pushing chains 90 are arranged behind the pre-grouped article groups 7, whereby the pusher bars are inserted coming from above. Due to the movement of the pusher bars 16 in the transport direction TR, article groups 7 are carried along on the transfer plate 15, which is equipped with a low-friction surface. Subsequently, the pusher bars 16 are moved upwards away from the article groups 7 and returned opposite to the transport direction TR above the generated article arrangements 5 that are guided on the transfer plate 15. The movement profile of the pusher bar 16 results in particular from the configuration and/or arrangement of the pushing chains 90.

Usually, the pusher bars 16 are moved over the transfer plate 15 in transport direction TR with a velocity that is at least slightly higher than the velocity of movement of the articles 2 on the conveyor belt 14. The distance of the pusher bars 16 on the pushing chains 90 and/or the speed of the pusher bars 16 result in a desired distance between successive article groups 7. In this way, several article groups 7 are put together in the transfer area 17 to form arrangements 5. Such an arrangement 5 contains the number and arrangement of articles 2 as can be found in the finished bundle 4. In addition, parallel-guided arrangements 5 of articles 2 are separated from each other in the transfer area 17 in accordance with the spreading dimension required in the film wrapping module 18.

For this purpose, outer guide elements 20 and inner guide elements 21 are provided in the transfer area 17. The outer guide elements 20 are essentially adjustable orthogonally to the transport direction TR. Thereby, the outer width of the transport track can be adjusted on the transfer plate 15. The adjustable inner guide elements 21 are used for generating the required distance between the arrangements 5 of articles 2.

The required spreading dimension or the necessary spacing A is defined by the specified film overlap in the film wrapping module 18 and also varies depending on the product. Traditionally, the required spread between the parallel article groups 7 formed by pre-grouping is set using an expansion wedge arranged, for example, in the transfer area 17. The arrangements 5 of articles 2, which are respectively distanced from each other, are then moved to the film wrapping module 18, wherein the arrangements 5 are moved in parallel. Currently, the required expansion wedges and the inner guides in the transfer area 17 of a so-called bundle forming unit are produced product-specifically by the order processing department. In the case of retrofitting, new expansion wedges and guides may have to be created for specific products. These must be changed by an operator during product changeover, which leads to corresponding production downtimes due to high changeover times. Due to a constantly growing range of new products, the automation of format part changes is difficult and time-consuming, as new format parts have to be designed and manufactured, especially for new products.

By the inner guide elements 21, which are particularly continuously adjustable, it is possible to adapt the packaging facility 1, in particular the transfer area 17 of the packaging facility 1, quickly and easily during a product change. In particular, no format parts need to be exchanged and no format parts need to be stored in the meantime. The adjustment of the inner guide elements 21 is carried out from below by a readjustment mechanism as described in detail below.

The arrangements 5 of articles 2 separated from the article rows 6 within the transfer area 17 are wrapped with shrink film 3 in the subsequently arranged film wrapping module 18 and fed to a shrinking device (not shown) via a further conveyor belt 19. In the shrink device, the shrink film 3 is shrunk onto the arrangements 5 of articles 2 to form a finished bundle 4.

FIG. 3 shows a detail of the transfer area 17 according to FIG. 2, in particular the inner guide elements 21 and their adjustability. FIG. 4 to FIG. 10 show different views of a first embodiment of the adjustment mechanism of the inner guide elements 21. In particular, FIG. 4 is a schematic representation; FIG. 5 shows a perspective view of a transfer area 17 seen from above; FIG. 6 shows a transfer area 17 seen from below, and FIG. 7 shows a perspective view of a transfer area 17 seen from below. Furthermore, FIG. 8 to FIG. 10 show different sectional views through the transfer area 17 in the range of the adjustment elements for the inner guide elements 21.

With the inner guide elements 21, a distinction is made in particular between the first inner guide elements 22 and the second inner guide elements 23. The first inner guide elements 22 are attached to one first end 26 of the second inner guide elements 23 via a pivot point 25 and can be rotated or pivoted around this pivot point 25. The second end 27 of the first inner guide elements 22 on the opposite side is free and beveled in such a way that the two second ends 27 of the two first inner guide elements 22 touch each other and form a tip of the adjustable expansion wedge 24.

According to the first embodiment, the inner guide elements 21, 22, 23 are adjusted from below by a magnetic coupling. The transfer plate 15 is either slotted within the adjustment range or equipped with long slots 40. To this transfer plate 15, a continuous plastic or other suitable non-magnetic coating 41 can be applied, for example, by gluing the coating onto the upper surface of the transfer plate 15. This results in a continuous surface of the transfer plate 15 with no obstructions on which the articles 2 could get stuck and which would hinder the transport of the articles 2. A magnet 42 is attached to the underside of the inner guide element 21 and rests on the transfer plate 15. A counter magnet 43 is mounted underneath the transfer plate 15 in the area of the corresponding long slot 40. This counter magnet 43 is preferably slidably mounted in the long slot 40. For example, the counter magnet 43 is arranged on a movable slide 50 or similar, which can be moved by a slide guide 51 in a movement range B defined by the long slot 40. Through the non-magnetic coating 41, the magnets 42, 43 attract each other and align with each other. If the position of the lower counter magnet 43 is now adjusted by suitable adjustment device 44, e.g. by a crank, an electric drive 45 (see FIG. 5 to FIG. 7) or the like, the magnetic coupling between magnet 42 and counter magnet 43 adjusts the position of the associated inner guide element 21 accordingly.

In particular, according to the first described embodiment, it is possible to use the first inner guide elements 22 to generate the required distancing or spread of the article groups 7 (see FIG. 1 and FIG. 2) steplessly adjustable and to completely eliminate the format part of an expansion wedge. In particular, two first inner guide elements 22 form a so-called split, adjustable expansion wedge 24.

In addition, FIG. 5 to FIG. 7 show that the adjustment of the two internal guiding elements 21-1, 21-2 can be coupled with each other. In this example, the readjustment mechanism comprises a circulating adjustment chain 47 underneath the transfer plate 15, arranged transversely to the transport direction TR, on which the two counter magnets 43-1 and 43-2 are fixed. The two counter magnets 43-1 and 43-2 are fixed on the adjustment chain 47 in such a way that they carry out counter-rotating movements when the adjustment chain 47 is moved. In particular, the adjustment chain 47 has two deflection areas 48-1, 48-2, between which a first part of the adjustment chain 47 carries out a movement in a first movement direction R1 and an opposite, second part of the adjustment chain 47 carries out a movement in a second, counter-rotating movement direction R2. In particular, the counter magnet 43-1 is attached in the first part of the adjustment chain 47 between the two deflection areas 48-1 and 48-2 and assigned to a long slot 40. The counter magnet 43-2 is attached in the second part of the adjustment chain 47 between the two deflection areas 48-1 and 48-2 and assigned to a long slot 40.

During an inward movement of counter magnet 43-1, counter magnet 43-2 gets moved inwards in synchronous motion. The movement of the counter magnets 43-1, 43-2 is transmitted to the inner guide elements 21-1, 21-2 via the magnets 42 (not visible in FIG. 5 to FIG. 7, see FIG. 8 to FIG. 10) arranged on the inner guide elements 21-1, 21-2. Accordingly, the inner guide elements 21-1, 21-2 move towards each other. During an outward movement of one counter magnet 43-1, the other counter magnet 43-2 is moved outwards in synchronism with the counter magnet 43-1. Accordingly, the inner guide elements 21-1, 21-2, which movement is coupled to the counter magnets 43-1, 43-2 via the magnets 42, move away from each other.

The schematic top view of FIG. 11 shows a first arrangement of the inner guide elements 21, 22, 23, whereby the formation of two parallel arrangements 5 of articles 2 according to FIG. 2 is generated in the transfer area 17 and FIG. 12 shows a corresponding representation in the side view.

The first inner guide elements 22 are arranged at an angle inclining towards each other, so that the free second ends 27 of the two first inner guide elements 22 are approaching and/or touching each other. As a result, the outward facing sides 60 of the two first inner guide elements 22 as well as the outward facing sides 64 of the second inner guide elements 23 each act as inner guides for the separated arrangements of articles (not shown, see FIG. 2), while the outer guide elements 20 form the outer guides within the transfer area 17.

The further schematic top view of FIG. 13 shows a second arrangement of the inner guide elements 21, 22, 23, whereby the formation of a single arrangement 5 of articles 2 in the transfer area 17 is generated and FIG. 14 shows a corresponding representation in the side view.

The first inner guide elements 22 are arranged at an angle diverging from each other so that a distance d is formed between the free second ends 27 of the two first inner guide elements 22, which is greater than a depth T of the arrangement 5 of articles 2 transverse to the transport direction TR. As a result, the inward facing sides 61 of the two first inner guide elements 22 each act as outer guides for the separated arrangements 5 of articles 2, so that the articles 2 arriving in article groups 7 are united. In addition, the inward facing sides 65 of the second inner guide elements 23 arranged subsequently in the transport direction also act as outer guides for the further movement of the united arrangement 5 of articles 2 in the transport direction TR.

Figure 15:
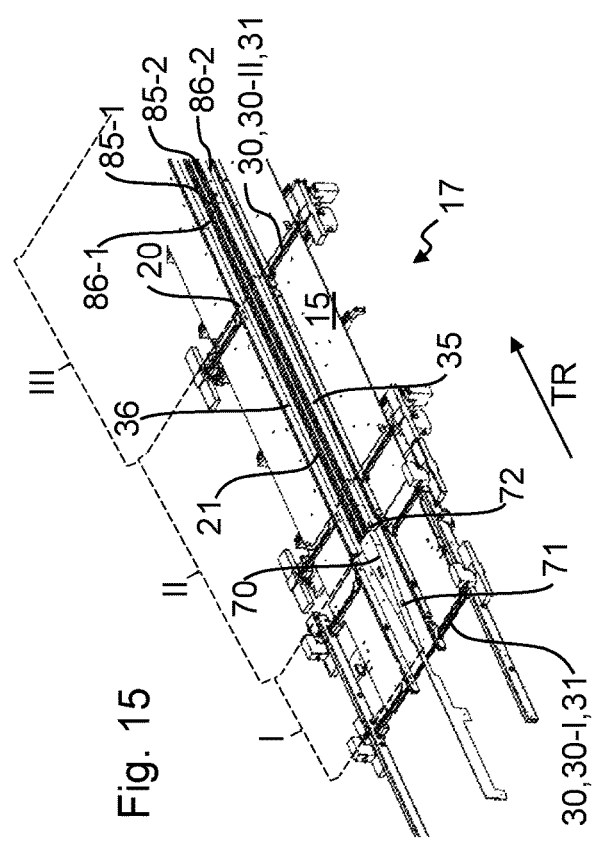
FIG. 15 shows a second embodiment of a transfer area with sectionally adjustable inner guidance.

The perspective view of FIG. 15 shows a second embodiment of a transfer area 17 with a sectionally adjustable inner guide. In this embodiment, a fixed expansion wedge 70 is provided in a transport segment I of the transfer area 17, whereby the transport segment I is arranged first in the transport direction TR. The transport segment I is followed by inner guide elements 21 of a subsequent second transport segment II, which inner guide elements 21 can be adjusted from below. The outer sides of the inner guide elements 21 each forms an inner guidance of the article arrangements to be formed (not shown). In addition, outer guide elements 20 are provided, which can be adjusted in a known manner by readjustment mechanism 30 arranged above the transfer plate 15 in order to determine the outer width of the transport track. The readjustment mechanism 30 essentially act vertically onto the outer guide elements 20, which are arranged parallel to the transport direction TR. In particular, the outer guide elements 20 of the transport segments I and II can each have their own readjustment mechanism 30-I, 30-II and can therefore be independently adjustable. The inner guide elements 21 located in transport direction TR behind the expansion wedge 70 can be adjusted from below in analogy to the first embodiment described above. Depending on the requirements of the desired product configuration and the subsequent packaging module, it may be provided that the inner guide elements 21 can be arranged and/or adjusted parallel to the transport direction TR and/or at an angle to the transport direction TR.

Furthermore, it may also be provided that the outer guide elements 20 can be adjusted at least in certain areas in the transport direction TR either diverging away from each other or converging towards each other. Similarly, the inner guide elements 21 are adjusted at least regionally diverging or converging towards each other in order to bring the article arrangements to the appropriate spreading distance required for the subsequent film wrapping module (not shown).

Preferably, an inner guide element 21 of the second transport segment II is arranged at each of the two rear corners 72 of the expansion wedge 70. In particular, it is intended that there is a swiveling connection between the respective corner 72 and the respective free end of the inner guide element 21. The adjustment of the inner guide elements 21 in the second transport segment II and, if applicable, additional subsequent transport segments III etc. is carried out in such a way that the inner guide elements 21 form two rows 85-1, 85-2 in transport direction TR. The two rows 85-1, 85-2 are arranged at least in sections parallel to the transport direction TR and/or at least in sections converging in the transport direction TR and/or at least in sections diverging from each other in the transport direction TR, in each instance depending on the required spreading distance.

The expansion wedge 70 divides the transfer area 17 into two transport tracks 86-1 and 86-2. In particular, several of the pre-grouped articles 2 fed in parallel rows (see FIG. 1 and FIG. 2) are grouped by the expansion wedge 70 in two article arrangements 5 and fed into the two transport tracks 86-1 and 86-2. Hereby, one outer side 71 of the expansion wedge 70 and the outer sides 35 of the subsequently adjoining inner guide elements 21 form the inner guidance of the respective transport track 86-1, 86-2. Additionally, one inner side 36 of the above-mentioned outer guide elements 20, which are essentially arranged in an alignment, form the outer guidance of the respective transport track 86-1, 86-2. The necessary spacing between the article arrangements 5 or spreading apart of the article arrangements 5 for the subsequent processing in the packaging module 18 (compare FIG. 1 and FIG. 2) is made possible by the adjustable arrangement of the inner guide elements 21 of the subsequently arranged transport segments II, III, etc. and the outer guide elements 20 of the first, second and subsequent transport segments I, II, III, etc.

Figure 17:
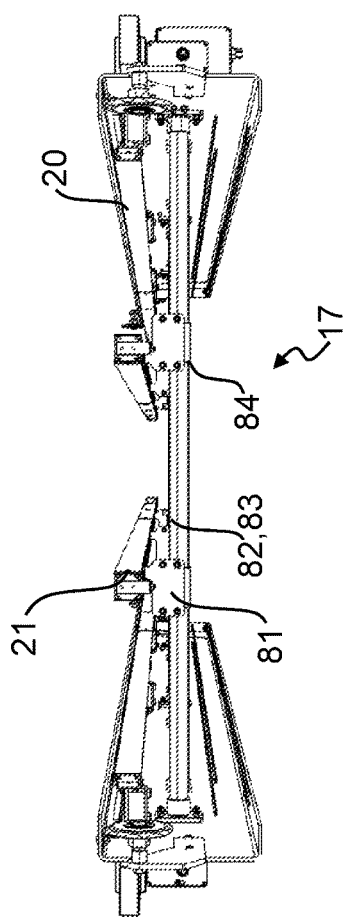
FIG. 17 shows a perspective representation of a transfer area seen from the front to represent the further embodiment of an adjustment of the inner guide elements according to FIG. 16.

FIG. 16 shows a perspective view of the transfer area 17 from below in order to illustrate a further embodiment of an adjustment of the inner guide elements (not shown). FIG. 17 shows a perspective view of the transfer area 17 as seen from the front to illustrate the further embodiment of an adjustment of the inner guide elements according to FIG. 16. For a better view, the transfer plate 15 was omitted in FIG. 17.

In the embodiment shown here, a slit 80 running through the transfer plate 15 transverse to the transport direction TR is provided (see FIG. 16). A thin metal sheet 81 is passed through the slit 80, to which metal sheet 81 the respective inner guide element 21 is attached (see FIG. 17). Below the transfer plate 15, the metal sheet 81 is mounted to a corresponding adjustment mechanism. By this adjustment mechanism, the metal sheet 81 is movable on the transfer plate 15 at least in some areas perpendicular to the transport direction TR of the articles (not shown). For example, the inner guide element 21 is shiftably mounted on a readjustment bar 82 located vertically to the transport direction TR below the transfer plate 15. In the illustration of FIG. 16, the metal sheets 81 and thus the inner guide elements 21 (see FIG. 17) are arranged within the peripheral area of the transfer plate 15. As a rule, this situation is only present in the initial assembly operation whereby the inner guide elements 21 are positioned for the first time within the central area of the transfer plate 15 via the readjustment mechanism formed by the metal sheet 81, the readjustment bar 82 and, if applicable, a suitable drive 45, as shown for example in FIG. 17.

With this embodiment, special care must be taken to ensure that slits 80 are as narrow as possible so that they do not obstruct the transfer of the articles (not shown) over the transfer plate 15.

As already described in connection with the embodiment illustrated in FIG. 5 to FIG. 7, the adjustment of the inner guide elements 21 within a transport segment II, III, etc. can be coupled with each other. For example, the readjustment bar 82 can be designed as a spindle bar 83 with an external thread, and the metal sheet 81 can be attached below the transfer plate 15 on a slide 84 with an internal thread. For example, half the spindle bar 83 can have a right-hand external thread while the other half of the spindle bar 83 has a left-hand external thread. The slides 84 have a corresponding internal thread, depending on their assignment to one half of the spindle bar 83 or to the other half of the spindle bar 83. By turning the spindle bar 83, both slides 84, each together with their respective associated metal sheet 81 and inner guide element 21, are moved inwards or outwards. This means in particular that the inner guide elements 21 move either towards each other or away from each other. Alternatively, it can also be provided for in this embodiment that the inner guide elements 21 each have their own independent drive and can therefore be adjusted independently of each other, thus further increasing the flexibility of the overall system.

If the embodiment with expansion wedge 70 shown in FIG. 15 to FIG. 17 is to be used for a single-lane combination or unification of several parallel, pre-grouped article rows according to FIG. 13, the expansion wedge 70 can be removed from the first transport segment I of the transfer area 17 and the desired grouping of articles 2 can be achieved by appropriate arrangement of the inner guide elements 21 of the subsequent transport segments II, III, etc. In this case, articles 2 (see FIG. 1 and FIG. 2) entering and further moving on the transfer plate 15 by being pushed forward are either not guided laterally in the first transport segment I or the outer guide elements 20 of the first transport segment I are positioned accordingly to ensure the outer guidance of the articles within the first transport segment I.

Figure 18:
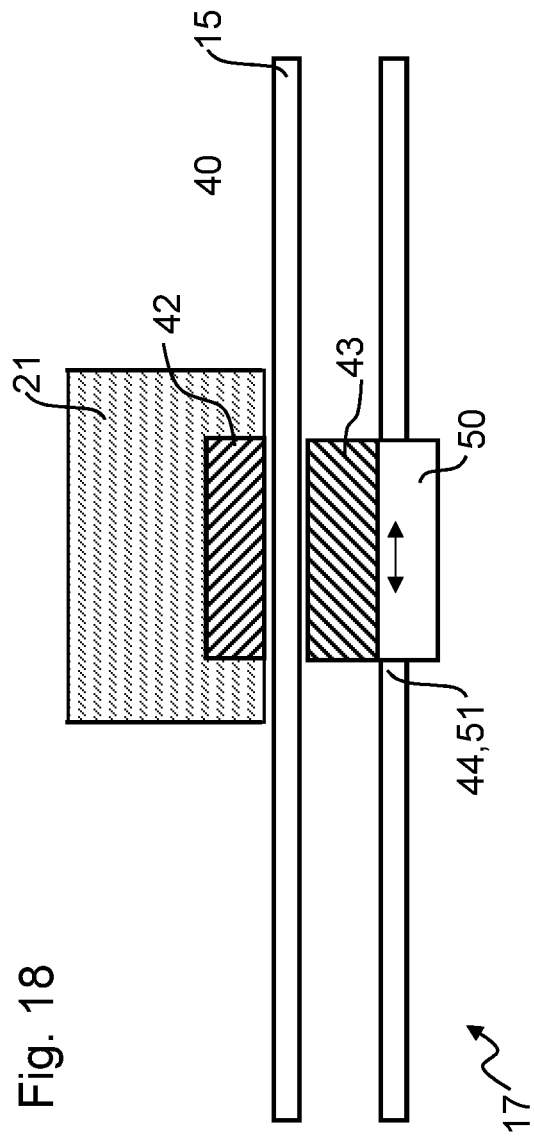
FIG. 18 shows a schematic illustration of a third embodiment for adjusting the inner guide elements.

FIG. 18 shows a schematic illustration of a third embodiment of the adjustment of the inner guide elements 21, particularly the inner guide elements 21 are adjusted from below by of a magnetic coupling analogous to the first design form shown in FIG. 4. A magnet 42 is attached to the underside of the inner guide element 21 and rests on the transfer plate 15. A counter magnet 43 is arranged underneath the transfer plate 15. The counter magnet 43 is thereby arranged in a movable manner transversely to the transport direction of the articles (not shown). The magnet 42 and the counter magnet 43 must have a sufficient magnetic force to act through the transfer plate 15.

If the position of the lower counter magnet 43 is now adjusted by of suitable adjustment device 44, e.g. by a crank or the like, the associated inner guide element 21 is adjusted accordingly by magnetic coupling between magnet 42 and counter magnet 43. The adjustment can be carried out manually, by of an electric drive 45 (see FIG. 5 to FIG. 7) or the like. Therefore, it is also possible with this third embodiment to use the first inner guide elements 22 to generate the required spreading of the article groups 7 (see FIG. 1 and FIG. 2) in a steplessly adjustable manner and, if necessary, to completely eliminate the format part of an expansion wedge.

With the inner guide elements 21 described here, which can be adjusted or readjusted according to the desired product requirements by of at least one readjustment mechanism arranged at least in some areas below the transfer plate 15, the adjustment of the guides and transport tracks of a transfer area 17 of a grouping unit during a product change can thus be achieved quickly and easily. The changeover process can easily be automated by using actuators or other suitable means. The elimination of format parts specially adapted to the respective product requirements eliminates time-consuming disassembly and assembly. In addition, there is no need to have format parts on hand for a corresponding retrofitting or changeover and to store these format parts in the meantime. In particular, the customer-specific construction of different expansion wedges for generating different spreading distances is not necessary. A product changeover is thus possible without any time required in advance, which was traditionally necessary for the provision of new product-specific format parts.

The embodiments, examples and variants described in the preceding paragraphs, the claims or the description of the figures as well as the figures, including their different views or individual characteristics, may be used independently of each other or in any combination. Characteristics described in conjunction with an embodiment shall be applicable to all embodiments, provided that the characteristics are not incompatible. In particular, the counter magnet 43 (see FIG. 4) can also be adjusted by of a suitable spindle mechanism or other suitable readjustment mechanisms. A metal sheet 81 extending through the transfer plate 15 in the area of a long slot 40 or a slit 80 can also be arranged on a circulating guiding chain (as shown, for example, in FIG. 6 and FIG. 7), which enables the desired displacement and/or arrangement of the metal sheet 81 within the long slot 40 or slit 80 by a corresponding movement of the same.

The invention has been described with reference to preferred embodiments. To the expert, it is also conceivable, however, to make changes and modifications without leaving the scope of protection of the appended claims.

LIST OF REFERENCE CHARACTERS

1 Packaging facility
2 Articles
3 Shrink film
4 Bundle
5 Arrangement
6 Article row
7 Article group
10 Article feed
11 Conveyor belt
12 Lane separator
13 Divider
14 Conveyor belt
15 Transfer plate
16 Pushing device/Pusher bar
17 Transfer area
18 Film wrapping module/packaging module
19 Conveyor belt
20 Outer guide element
21, 21-1, 21-2 Inner guide element
22 First inner guide element
23 Second inner guide element
24 Adjustable expansion wedge
25 Pivot point
26 First end
27 Second (free) end 30, 30-I, 30-II Readjustment mechanism
31 Readjustment spindle
35 Outer side
36 Inner side
40 Long slots
41 Coating
42 Magnet
43, 43-1, 43-2 Counter magnet
44 Adjustment device
45 Drive
47 Adjustment chain
48-1, 48-2 Deflection area
50 Slide
51 Slide guide
60 Outward facing side
61 Inward facing side
64 Outward facing side
65 Inward facing side
70 Expansion wedge
71 Outer side
72 Corner
80 Slit
81 Metal sheet
82 Readjustment bar
83 Spindle bar
84 Slide
85-1, 85-2 Row
86-1, 86-2 Transport track
90 Pushing chain
A Spacing
B Movement range
d Distance
I, II, III Transport segment
R1, R2 Movement direction
T Depth
TR Transport direction

The invention claimed is:

1. A transport section (17) for feeding article arrangements (5) in a transport direction (TR) to a packaging module (18) for the article arrangements (5), the transport section (17) comprising:
a transfer plate (15), on which the articles (2) of the article arrangements (5) are movable in transport direction (TR) in a sliding manner, wherein at least one area of the transfer plate (15) has openings that are formed to be orthogonal to the transport direction (TR) of the articles (2);
one or more pushing devices (16) disposed above the transfer plate (15), for moving the articles (2) on the transfer plate (15), wherein the one or more pushing devices (16) are movable in transport direction (TR);
one or more outer guide elements (20) disposed on the transfer plate (15), with the one or more outer guide elements (20) laterally delimiting the transport section (17); and
one or more inner guide elements (21) disposed on the transfer plate (15), wherein the inner guide elements (21) are readjustable by at least one readjustment mechanism that is disposed at least partly below the transfer plate (15), and wherein at least a portion of the readjustment mechanism is movable within the openings of the transfer plate (15).

2. The transport section (17) of claim 1, wherein the one or more inner guide elements (21) each comprise a first magnet (42), and wherein the at least one readjustment mechanism comprises a second magnet (43), wherein, by transferring the second magnet (43) from a first operating position into a second operating position, each of the one or more inner guide elements (21) is transferred from a first position and/or arrangement on the transfer plate (15) into a second position and/or arrangement on the transfer plate (15).

3. The transport section of claim 2, wherein the second magnet (43) of the at least one readjustment mechanism is guided within the openings.

4. The transport section of claim 3, wherein a non-magnetic coating (41) is disposed on the transfer plate (15), with the non-magnetic coating (41) covering the openings.

5. The transport section as recited in claim 4, wherein the transport section (17) is divided in transport direction into a plurality of segments, wherein each segment is assigned two inner guide elements (21).

6. The transport section of claim 5, wherein the two inner guide elements (21) of a segment is coupled to the at least one readjustment mechanism such that the two inner guide elements (21) of one segment are adjustable together, or wherein each of the inner guide elements (21) of a segment is coupled to its own readjustment mechanism such that the two inner guide elements (21) of a segment are adjustable independently of one another.

7. The transport section of claim 5, wherein two first inner guide elements (22) are disposed at an angle to the transport direction (TR) in a first segment in an infeed area of the transport section (17), wherein the angle of the two first inner guide elements (22) is adjustable relative to the transport direction (TR).

8. The transport section as recited in claim 7, wherein two second inner guide elements (23) are disposed parallelly to the transport direction (TR) at least in a segment disposed downstream from the infeed area of the transport section (17), wherein the two second inner guide elements (23) are formed to be movable perpendicular to the transport direction (TR).

9. The transport section of claim 8, wherein each first inner guide element (22) is disposed swivelably movable by a swivel joint (25) at a second inner guide element (23).

10. The transport section of claim 5, wherein an expansion wedge (70) is disposed in a first segment in an infeed area of the transport section (17), and wherein two readjustable inner guide elements (21) are disposed at least in a segment arranged downstream from infeed area of the transport section (17), wherein the inner guide elements (21) are adjustable to be parallel to the transport direction (TR) and/or at an angle to the transport direction (TR).

11. A method for adjusting and/or readjusting at least one transport track within a transport section (17) for feeding article arrangements (5) in a transport direction (TR) to a packaging module (18) for the article arrangements (5), comprising:
moving the articles (2) of the article arrangements (5) in transport direction (TR) on a transfer plate (15) in a sliding manner, wherein at least one area of the transfer plate (15) has openings that are formed to be orthogonal to the transport direction (TR) of the articles (2); and
adjusting at least one transport track by adjusting one or more inner guide elements (21) that are disposed on the transfer plate (15) by at least one readjustment mechanism that is disposed at least partly below the transfer plate (15), wherein at least a portion of the readjustment mechanism is movable within the openings of the transfer plate (15).

12. The method of claim 11, wherein the adjusting step comprises transferring a second magnet (43) of the at least one readjustment mechanism from a first operating position into a second operating position which transfers each of the one or more inner guide elements (21) from a first position and/or arrangement on the transfer plate (15) into a second position and/or arrangement on the transfer plate (15).

13. The method of claim 12, further comprising guiding the second magnet (43) of the at least one readjustment mechanism within the openings.

14. A packaging facility (1) for article arrangements (5), comprising:
   a grouping unit for assembling the articles (2), and
   a packaging module (18),
   wherein the grouping unit comprises a transport section (17) comprising:
      a transfer plate (15), on which the articles (2) of the article arrangements (5) are movable in transport direction (TR) in a sliding manner, wherein at least one area of the transfer plate (15) has openings that are formed to be orthogonal to the transport direction (TR) of the articles (2);
      one or more pushing devices (16) disposed above the transfer plate (15), for moving the articles (2) on the transfer plate (15), wherein the one or more pushing devices (16) are movable in transport direction (TR);
      one or more outer guide elements (20) disposed on the transfer plate (15), with the one or more outer guide elements (20) laterally delimiting the transport section (17); and
      one or more inner guide elements (21) disposed on the transfer plate (15),
      wherein the inner guide elements (21) are readjustable by at least one readjustment mechanism that is disposed at least partly below the transfer plate (15), and wherein at least a portion of the readjustment mechanism is movable within the openings of the transfer plate (15).

\* \* \* \* \*